United States Patent

[11] 3,599,940

[72] Inventor Lawrence Peoples
Bay City, Mich.
[21] Appl. No. 881,087
[22] Filed Dec. 1, 1969
[45] Patented Aug. 17, 1971
[73] Assignee The Dow Chemical Company
Midland, Mich.

[54] METHOD FOR SATURATED LIQUID AEROSOL FORMULATIONS
3 Claims, 1 Drawing Fig.

[52] U.S. Cl. ................................................. 259/18
[51] Int. Cl. ................................................. B01f 5/00
[50] Field of Search........................................ 259/1, DIG. 44, DIG. 30, 4, 18, 2, 36, 60; 261/78

[56] References Cited
UNITED STATES PATENTS
3,278,165 10/1966 Gaffney....................... 259/1
3,285,579 11/1966 Guerin......................... 259/4
3,176,964 4/1965 Cottell......................... 259/1

Primary Examiner—Robert W. Jenkins
Attorneys—Griswold & Burdick, Glwynn R. Baker and C. E. Rehberg ABSTRACT: A method for saturating liquid formulations prior to loading into aerosol containers comprising introducing the liquid formulation into a pressurized chamber in such a manner to impinge onto the edge of a rapidly vibrating blade, withdrawing the gas-saturated liquid from the pressurized chamber into a storage chamber maintained under a similar pressure thereby to maintain the gas-saturated liquid intact, said pressurization of the chamber being maintained by introduction of the saturating gas.

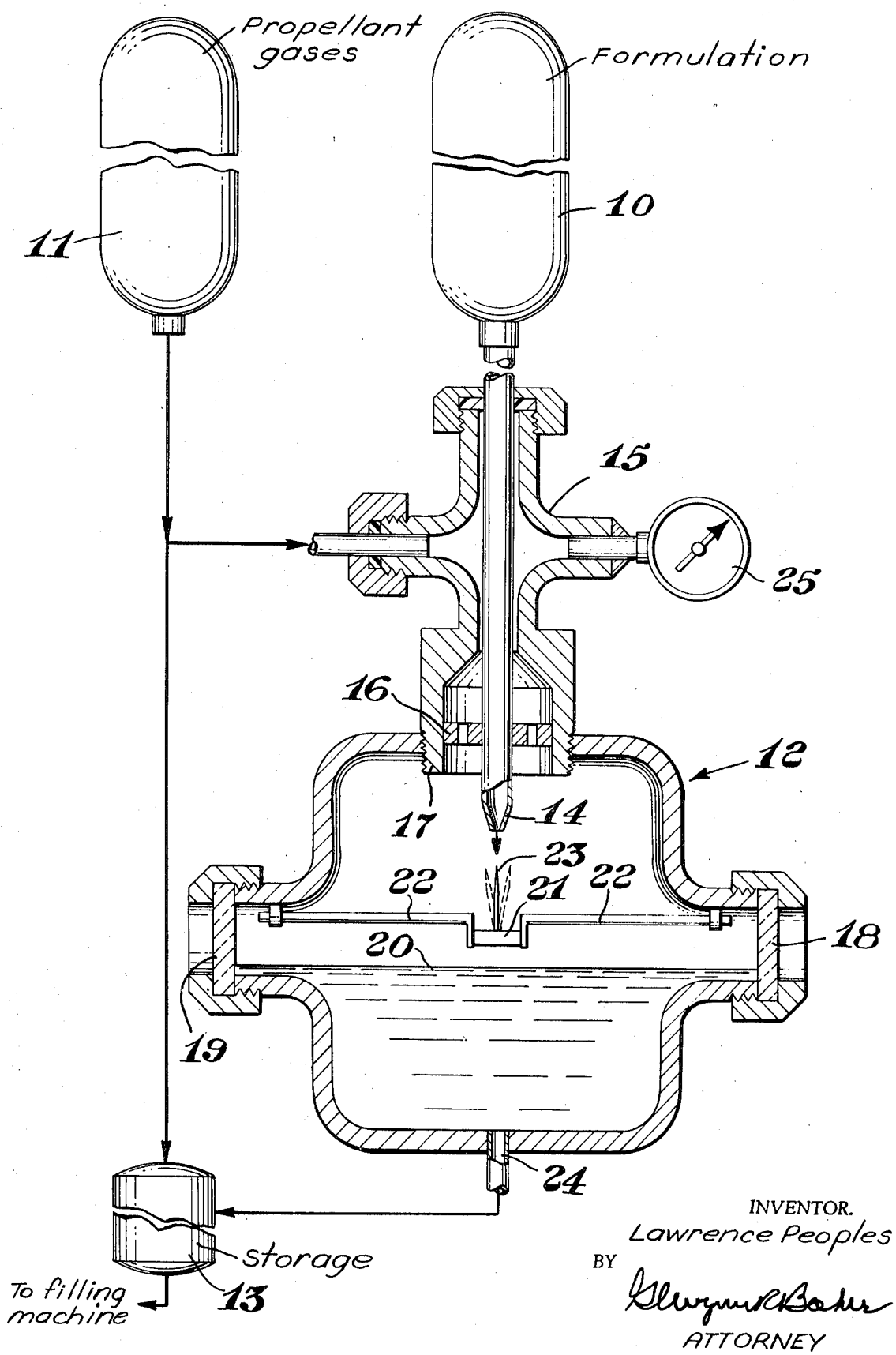

METHOD FOR SATURATED LIQUID AEROSOL FORMULATIONS

BACKGROUND OF INVENTION

The art of filling aerosol product containers with the formulation and a propellant gas is commonly carried out in one of the two following general procedures. One employs a large pressure vessel into which the formulation is introduced through an atomizing spray-type distributor into zone of the gases under pressure, both above and the liquid maintained in the bottom of the vessel. The major problem is the large inventory and the expense of the vessel. The other technique is a batch-mix employing a tank and mechanical agitation of the formulation under pressure of the saturating gas.

BRIEF DESCRIPTION OF INVENTION

In accordance with the present invention, an aerosol formulation is saturated with the propellant gas(es) by introducing the formulation into a small pressurized chamber in a manner to impinge the incoming stream onto the edge of a flexible blade. The impingement of the liquid formulation onto the blade edge causes the blade to vibrate breaking the fluid into minute droplets which permits saturation of the fluid with the surrounding gaseous atmosphere. The chamber in which the saturation is conducted is small, therefore the liquid when saturated with the gas(es) is delivered to a storage tank maintained under a similar pressure as the saturating chamber. Aerosol containers are then filled directly from the storage tank by means of a commercial filling apparatus.

The apparatus employed to conduct the process of the present invention is illustrated in the FIGURE. The apparatus consists of a formulations tank 10, a propellant tank 11, a saturator chamber 12, a storage tank 13, and associated piping to carry the various components to and from the tanks and chamber. More particularly the formulations tank 10, which is a pressure vessel, is connected to nozzle 14 which enters chamber 12 through header 15. The propellant tank 11, likewise a pressure vessel, is connected to header 15 in a manner such that the propellant gas(es) enter the chamber 12 circumferentially around the nozzle 14. To ensure distribution of the propellant gas(es) a distributor plate 16 is provided within the header 15 near the lower end 17 thereof. The chamber 12 is a pressure vessel having viewing ports 18 and 19 on opposite sides so that an operator can observe the fluid level 20 within the chamber. Suspended immediately below the nozzle 14 is a block 21 adjustably held above the liquid level 20, by suspension bars 22. Mounted on the upper surface of the block 21 is a thin blade 23 which is capable of lateral vibratory movement. The chamber 12 is provided with an outlet 24 which, with piping, connects the chamber 12 to a storage vessel 13 which is maintained under pressure through piping connecting it to the propellant gas(es) tank 11. Storage vessel 13 is further connected by piping to an aerosol filling machine (not shown). A pressure gauge 25 may be connected to the header 15 as shown, thus enabling an operator to ascertain the propellant gas(es) pressure within chamber 12.

In operation an aerosol formulation such as that employed to maintain the human hair in place is charged to formulation tank 10 and a pressure impressed over the liquid. A propellant gas or gases is charged from tank 11 under pressure. By manipulation of valves (not shown) in the lines of piping leading from each tank to the header 15, the fluids are delivered to the nozzle 14 and distributor plate 16 into the chamber 12. The formulation from nozzle 14 impinges on the edge of blade 23 and is broken up into minute droplets which are dispersed throughout the propellant gas(es) and dissolve the gas(es) to the saturation point under the pressure of the chamber 12. The saturated droplets of formulation drop into the body of liquid in the chamber 12 and pass into the storage tank 13 which is under the same pressure as the chamber. The formulation saturated with propellant gas(es) is withdrawn from storage tank 13 to aerosol container filling machines.

DETAILED DESCRIPTION OF INVENTION

The following examples illustrate the present invention:

Example 1

A commercially available chlorinated hydrocarbon cleaning composition consisting of a mixture of 1, 1, 1-trichloroethane 75 percent and perchloroethylene 25 percent from a 1½-gallon pressure tank was introduced into the chamber of an apparatus similar to that shown in the drawing which had a holdup capacity for liquid of about two cups. The propellant gas, nitrous oxide, was admitted under 120 p.s.i.g. The saturated cleaning mixture was pressure filled into 8-ounce aerosol can. The average pressure of the cans filled was 100 p.s.i.g.

In a similar manner methanol was pressurized with $CO_2$ under 230 p.s.i.g. The cans were pressure filled to an average pressure of about 120 p.s.i.g.

To demonstrate the advantages of the present invention over previously commercially employed techniques for saturating formulations, a run was made in a spray-type, 15-gallon saturator, into which was pressurized about 10 gallons of formulation and nitrous oxide, under 118 p.s.i.g. The average pressure in the filled cans was 85 p.s.i.g.

It is to be understood that while the description of the process includes a storage tank for the formulation after saturation, it is possible to fill aerosol containers directly from the saturator by connecting pipe 24 of the saturator directly to the aerosol filling apparatus.

I claim:

1. A method for incorporating an inert gas into an aerosol formulation which consists of introducing the aerosol formulation under pressure into a chamber in such a manner to impinge the stream of formulation onto a means for breaking the fluid into minute droplets, simultaneously introducing the gas into said chamber at such a rate that the chamber is maintained under a constant pressure sufficient to introduce the gas into said aerosol formulation.

2. The method of claim 1 wherein the gas is nitrous oxide.

3. The method of claim 1 wherein the gas is.carbon dioxide.